United States Patent [19]

Takagi et al.

[11] Patent Number: 4,691,308
[45] Date of Patent: Sep. 1, 1987

[54] APPARATUS FOR REPRODUCING INFORMATION FROM MAGNETOOPTICAL RECORDING MEDIUM

[75] Inventors: Akihiro Takagi, Kawasaki; Kiyoshi Kimoto, Tokyo, both of Japan

[73] Assignee: Nippon Kogaku K. K., Tokyo, Japan

[21] Appl. No.: 720,186

[22] Filed: Apr. 5, 1985

[30] Foreign Application Priority Data

Apr. 19, 1984 [JP] Japan ................................. 59-79280
Jun. 21, 1984 [JP] Japan ................................ 59-128118

[51] Int. Cl.$^4$ ............................................ G11B 11/10
[52] U.S. Cl. ........................................ 369/13; 369/46; 369/110
[58] Field of Search .................. 360/59, 114; 365/122; 369/13, 110, 106, 46, 45; 350/374, 375, 378, 379; 356/370, 400, 401, 222, 226, 221; 250/570, 578, 238, 201 DF, 201 AF

[56] References Cited

U.S. PATENT DOCUMENTS

| | | | |
|---|---|---|---|
| 4,558,440 | 12/1985 | Tomita | 360/59 X |
| 4,561,032 | 12/1985 | Matsumoto et al. | 369/110 X |
| 4,569,035 | 2/1986 | Tomita | 369/122 |
| 4,573,149 | 2/1986 | Degrichi et al. | 369/13 |

FOREIGN PATENT DOCUMENTS 169947 10/1982 Japan .

*Primary Examiner*—Aristotelis M. Psitos
*Attorney, Agent, or Firm*—Shapiro and Shapiro

[57] ABSTRACT

In an apparatus for irradiating a magnetooptical recording medium with a linearly polarized light beam and detecting the light from the medium, the light from the magnetooptical recording medium is divided, depending on the degree of the plane of polarization, into two light beams of different intensities which are respectively converted into electrical signals for supply to a differential amplifier, wherein an electrical signal corresponding to a light beam is amplified in order to eliminate the noise component in the output signal of the differential amplifier. In addition, the apparatus is so constructed that the amplification of the electrical signal corresponding to a divided light beam is controlled in response to the electrical signals corresponding to the divided light beams.

13 Claims, 10 Drawing Figures

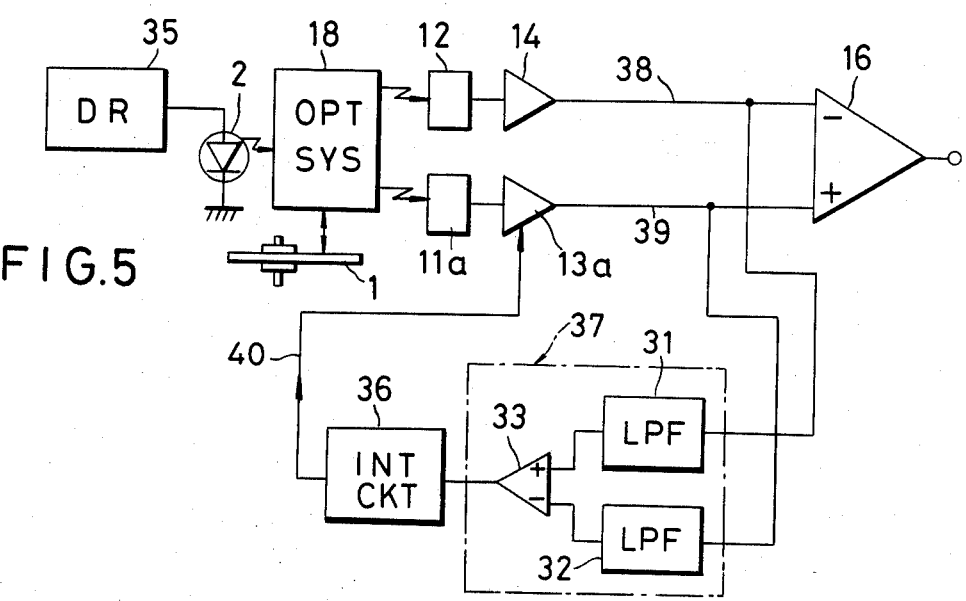
FIG. 5
FIG. 6A
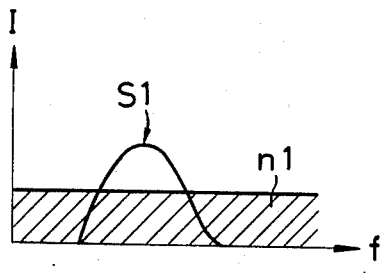
FIG. 6B
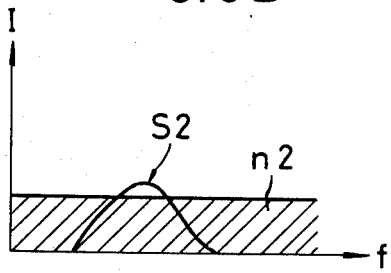
FIG. 6C
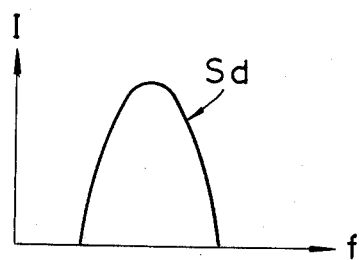
FIG. 6D
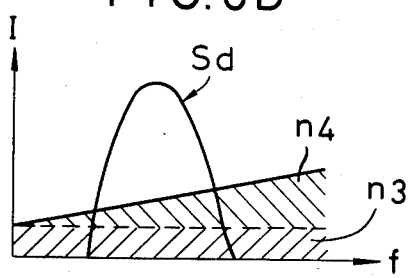
FIG. 7
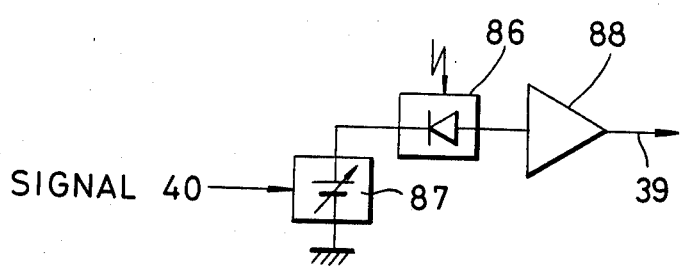

APPARATUS FOR REPRODUCING INFORMATION FROM MAGNETOOPTICAL RECORDING MEDIUM

BACKGROUND OF THE INVENTION

1. Field of the Invention

The present invention relates to an apparatus for irradiating a magnetooptical recording medium having Kerr effect or Faraday effect with linearly polarized light to reproduce the information recorded on said medium from the light transmitted or reflected by said medium.

2. Description of the Prior Art

In the field of apparatus for optically reproducing information recorded on a magnetooptical recording medium, there is already known, as disclosed in the Japanese Laid-open Patent Application no.No. 169947/1982, an apparatus of so-called differential method in which a laser beam light spot reflected or transmitted by a record face is divided into two optical paths according to the angle of plane of polarization, and two signals obtained by photoelectric conversion in thus divided two optical paths are supplied to a differential amplifier to mutually cancel the noise in phase, thereby obtaining the information signal alone.

More specifically, the light reflected or transmitted by the magnetooptical recording medium shows a change in the rotational angle of the plane of polarization by $\pm\theta k$, respectively by Kerr effect or Faraday effect, according to the record direction of vertical magnetization in said recording medium. In the above-mentioned apparatus, said reflected or transmitted light enters a polarized beam splitter at a suitable angle for division into two light beams of varying intensity according to the rotational angle of polarization, and said two light beams are respectively converted, for example with photodiodes, into electrical signals for supply to the differential amplifier. In two input signals to the differential amplifier, the information signals are mutually inverted in the polarity of amplitude according to the rotational angle of plane of polarization, so that an output signal can be obtained by adding and amplifying two input signals. On the other hand, the noise components contained in the reproduced signals are solely dependent on the light intensity and are in phase, so that they can be mutually cancelled by differential amplification.

However, in order to securely eliminate the noise in such apparatus, the noise components in phase contained in two input signals to the differential amplifier should have the same electrical level. In the Japanese Laid-open Patent Application No. 169947/1982, the differential amplifier is provided, at an input terminal thereof of a higher signal level, with an attenuator to control the signal gain, thus bringing the noise components to the same level.

The noise level control with such attenuator inevitably involves an attenuation of the information signal, so that the differential amplification of the input signals may be unable to provide a sufficiently high S/N ratio in the information signal.

SUMMARY OF THE INVENTION

An object of the present invention is to provide a magnetooptical information reproducing apparatus capable of providing a differential information output signal of a high S/N ratio by bringing the noise components in the input signals of the differential amplifier to the same signal level in a secure manner without the attenuation of the information signal.

The above-mentioned object is achieved according to the present invention by an apparatus in which the light from a magnetooptical recording medium is divided, depending upon the angle of the plane of polarization, into two light beams of different intensities which are respectively converted into electrical signals for supply to a differential amplifier, wherein an electrical signal corresponding to a light beam is amplified in order to eliminate the noise component in the output signal of said differential amplifier.

In addition, the apparatus of the present invention is so constructed that the amplification of the electrical signal corresponding to a divided light beam is controlled in response to the electrical signals corresponding to the divided light beams.

BRIEF DESCRIPTION OF THE DRAWINGS

FIG. 5 is a block diagram showing a second embodiment of the present invention;

FIGS. 6A, 6B, 6C and 6D are charts showing the frequency characteristics of input and output signals of the differential amplifier; and FIG. 7 is a circuit diagram showing a variable gain amplifier utilizing an avalanche photodiode.

DESCRIPTION OF THE PREFERRED EMBODIMENTS

Figure 1:
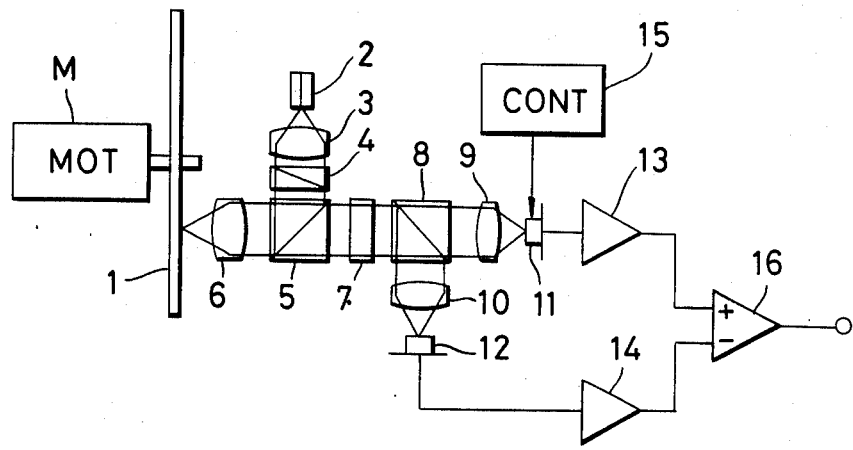
FIG. 1 is a schematic diagram of a first embodiment of the present invention.

At first reference is made to FIG. 1, wherein a magnetooptical recording medium 1 is composed of a glass or plastic substrate on which a magnetooptical material such as MnBi is deposited by sputtering or vacuum evaporation. An information signal is recorded on a recording track of the recording medium by the change in the direction of vertical magnetization. The recording medium is rotated, during the signal reproducing, at a constant speed by a motor M.

A detecting optical system for optically reading information recorded on said magnetooptical recording medium 1 is composed of a semiconductor laser 2 for irradiating the magnetooptical recording medium 1 with a laser beam spot; a collimating lens 3 for converting the laser beam from the semiconductor laser 2 into a parallel beam; a polarizer 4 for linearly polarizing the parallel light beam from the collimating lens 3; a beam splitter 5 for transmitting about 50% and reflecting the remainder of the linearly polarized light beam from the polarizer 4; and a condenser lens 6 for condensing the light beam from the beam splitter 5 to such an extent as cause diffraction thereby forming a beam spot on the recording face of the magnetooptical recording medium 1. The polarizer 4 may be dispensed with if the light beam from the semiconductor laser 2 shows sufficiently high linear polarization.

There is also provided an optical regenerating system for splitting the light reflected from the magnetooptical recording medium 1 into two optical paths, said system being composed of a half wavelength plate (λ/2-plate) 7 for rotating the plane of polarization of the reflected light transmitted by the beam splitter 5; a polarized beam splitter 8 for splitting the light from the λ/2-plate 7 into two optical paths according to the rotational angle of plane of polarization; a condenser lens 9 for focusing the light transmitted by the polarized beam splitter 8 onto an avalanche photodiode (APD) 11; and a condenser lens 10 for focusing the light reflected by the polarized beam splitter 8 onto a pin photodiode (PIN) 12 composed of a p-type semiconductor, an intrinsic semiconductor and an n-type semiconductor.

In the following there will be given a more detailed explanation of the beam splitting function according to the rotational angle of plane of polarization achieved by the λ/2-plate 7 and the polarized beam splitter 8. When the linearly polarized light enters the magnetooptical recording medium 1, the reflected light shows a change of $\pm\theta k$ in the angle of polarization, by means of Kerr effect, according to the direction of magnetization in said magnetooptical recording medium 1, which is either in a direction orthogonal to the rotating direction of said medium 1 by the motor M or in the opposite direction.

Figure 2:
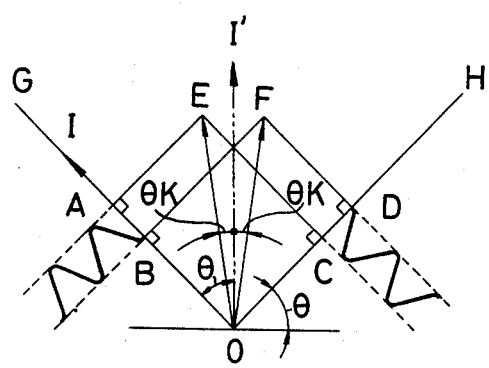
FIG. 2 is a vector diagram showing division of a given light quantity in the detecting optical system shown in FIG. 1.

Referring to a vector diagram shown in FIG. 2 in which the linearly polarized incident light beam to the medium 1 is represented by OI, the plane of polarization of the reflected light transmitted by the λ/2-plate 7 is rotated by $\pm\theta k$, as represented by vectors OE, OF with respect to the vector OI' according to the direction of magnetization, wherein said vector OI' corresponds to the reflected light through the λ/2-plate 7 resulting from the light OI when the medium 1 is replaced by a reflecting plane having no polarizing effect. The λ/2-plate 7 has a function of rotating the plane of polarization, and the position of the plate 7 with respect to the optical axis such that the plane of polarization of the light remains the same before and after transmission through the plate 7 is called a reference axis position. When the λ/2-plate 7 is rotated by a determined angle from said reference axis position in a plane perpendicular to the optical axis, the angle between the planes of polarization of the light before and after passing through the λ/2-plate 7 is equal to twice the rotating angle of said plate 7, and the intensities of two light beams divided by the beam splitter 8 can be determined according to said angle between two planes of polarization. The rotating angle of the λ/2-plate 7 is equal to half of the angle $\theta$ shown in FIG. 2.

FIG. 2 shows a case in which the APD 11 and the PIN 12 receive light of the same intensity divided by the beam splitter 8. When the rotating angle of the λ/2-plate 7 is so determined that the angle $\theta$ between OI and OI' is equal to 45°, the APD 11 detects a light component polarized in the direction of axis OH, while the PIN 12 detects a light component polarized in the direction of axis OG. Consequently the APD 11 receives light of which intensity varies between OD and OC, while the PIN 12 receives light of which intensity varies between OA and OB, wherein the signal AB and the signal CD are mutually the same but inverted in polarity.

When the beam splitter 8 divides the light into two beams of mutually equal intensities as shown in FIG. 2, the noise components contained in two regenerated signals after photoelectric conversion are mutually the same if the APD 11 and the PIN 12 have the same photoelectric converting characteristics, so that differential noise elimination is rendered possible without signal amplification.

Figure 3:
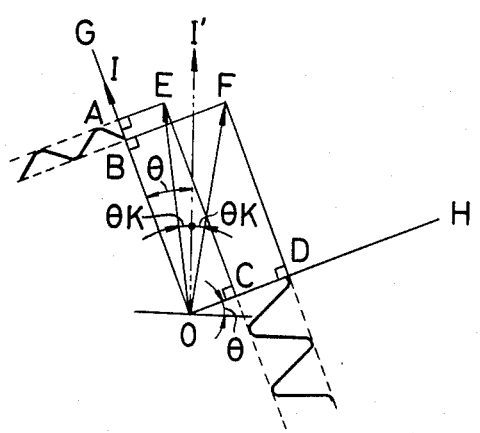
FIG. 3 is a vector diagram showing light division with mutually different intensities by the detecting optical system shown in FIG. 1.

On the other hand, in the embodiment of the present invention, the angle $\theta$ of the λ/2-plate 7 is selected as $\theta = 10°$ as shown in FIG. 3, whereby the PIN 12 receives more light than the APD 11.

When the λ/2-plate 7 is set at $\theta = 10°$, the intensity of light directed toward the APD 11 is represented by AB as in FIG. 2, but the average light intensity received by the APD 11 is different from that received by the PIN 12. Consequently the noise components (for example noise resulting from light source or caused by dust or scars on the recording medium 1) which are proportional to the average light intensity are not equal at the input terminals of the differential amplifier, so that the differential noise elimination cannot be achieved.

According to the present invention, therefore, there is provided a reverse voltage control circuit 15 for regulating the amplification factor of the APD 11 as shown in FIG. 1, whereby a suitable amplification factor is selected to effect an amplification at the photoelectric conversion in the APD 11 receiving less light, thereby obtaining a converted output signal the same as that from the PIN 12.

Figure 4:
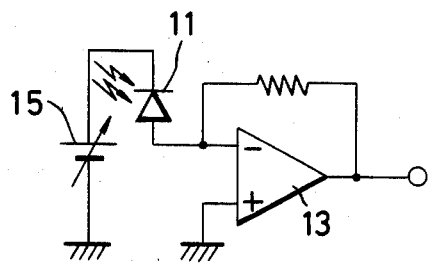
FIG. 4 is a circuit diagram of a basic circuit for determining the rate of amplification of APD (Avalanche photodiode) in the embodiment shown in FIG. 1.

FIG. 4 shows the APD 11 in the embodiment shown in FIG. 1, together with a basic circuit of the reverse voltage control circuit 15 and a buffer amplifier 13, wherein the amplification factor M of the photoelectric conversion in the APD 11 is rendered variable in a range from 1 to 600 times according to the inverse voltage determined by said reverse voltage control circuit 15.

More specifically, when the λ/2-plate 7 is set at $\theta = 10°$ with respect to the beam splitter 8 as shown in FIG. 3:

Average light intensity received by APD 11:

$$A^2\sin^2\theta = 0.030 \cdot A^2$$

Average light intensity received by PIN 12:

$$A^2\cos^2\theta = 0.970 \cdot A^2$$

so that the amplification factor M for obtaining the converted output signal, from the APD 11, of a level the same as that from the PIN 12 is determined by the following equation (1):

$$M = \frac{\cos^2\theta}{\sin^2\theta} = \frac{1}{\tan^2\theta} \approx 32.2 \tag{1}$$

wherein A represents the length of vector OI.

However, since the amplification factor of the APD 11 is considerably dependent on temperature, a sufficient temperature compensation is provided in the practical circuit.

Again referring to FIG. 1, buffer amplifiers 13, 14 respectively connected to the APD 11 and PIN 12 convert the photoelectrically converted currents into voltage signals with the same converting gain so that said amplifiers 13, 14 can be regarded in approximation as amplifiers with a gain of unity. The converted output signal from the buffer amplifier 13 is supplied to the positive input terminal of the differential amplifier 16, while the converted output signal from the buffer amplifier 14 is supplied to the negative input terminal of said differential amplifier 16, which thus cancels the noise components in phase and having the same average level.

In the following there will be explained the function of the embodiment shown in FIG. 1.

In the regenerating operation, the magnetooptical recording medium 1 is rotated at a constant speed by the motor, and the tracking of the beam spot on the recording face of the magnetooptical recording medium 1 is controlled by a servo system (not shown).

The laser beam from the semiconductor laser 2 is converted into a parallel beam by the collimating lens 3, then linearly polarized by the polarizer 4, reflected by ca. 50% by the beam splitter 5 and focused by the condenser lens 6 as a beam spot on the recording face of the magnetooptical recording medium 1. The incident laser beam constituting the beam spot is subjected, by means of Kerr effect, to a rotation of the plane of polarization by $\pm\theta k$ according to the direction of vertical magnetization on the recording face of the magnetooptical recording medium 1, and the resulting reflected light is again converted into a parallel beam by the condenser lens 6, then passes the beam splitter 5 and enters the $\lambda/2$-plate 7. Said plate 7 is so positioned that the angle $\theta$ between the vectors OI and OI' is equal to 10° as shown in FIG. 3, whereby the polarized beam splitter 8 reflects a polarized component along the axis OG while it transmits a polarized component along the axis OH, thus dividing the regenerated light beam into two optical paths. Because of the set angle of $\theta=10°$ of the $\lambda/2$-plate 7, the intensity of the polarized component reflected by the beam splitter 8 is naturally less than that of the polarized component transmitted by said beam splitter 8. The light beams divided by the beam splitter 8 are respectively focused by the condenser lenses 9, 10 onto the APD 11 and PIN 12 for conversion into electrical signals.

The APD 11 is regulated to an amplification factor M, given by the aforementioned equation (1), under the control with the inverse voltage control circuit 15, so that the APD 11 generates, despite the less light intensity, an average converted current the same as that of the PIN 12, through amplification with the amplification factor M.

The currents from the APD 11 and PIN 12 are respectively converted in the buffer amplifiers 13, 14 and supplied to the differential amplifier 16.

In the two reproduced signals supplied to said differential amplifier 16, the information signals are mutually inverted in polarity due to the rotation of plane of polarization, while the noise components are in phase because they are solely dependent on the light intensity. Consequently the differential amplifier 16 outputs an information signal as the sum of two input information signals by differential amplification of said signals of mutually inverted phases. On the other hand, the two noise components which are brought to the level by the amplification in the APD 11 and are in phase are mutually cancelled in the output of the differential amplifier. Therefore, the S/N ratio of the information signal obtained from the differential amplifier 16 is improved by about 4 db, in comparison with the case of regulating the input signals to the amplifier 16 with an attenuator.

In the reproduction of an information signal with the differential amplifier 16, the common phase noise components of the same level can be completely eliminated if said differential amplifier is ideal and is provided with an infinitely large common mode rejection ratio, but in practice the common mode rejection ratio (CMRR) has a finite value. Under such circumstance, it is more advantageous, for the elimination of the noise component of common phase by differential amplification, to select an angle $\theta$ smaller than 45° for the $\lambda/2$-plate 7 as shown in FIG. 3 thereby reducing the light intensity directed to the APD 11, than to select said angle $\theta$ equal to 45° for splitting the light equally, since the proportion of the noise component in the regenerated signal from the APD 11 decreases in the former case. It is also experimentally confirmed that the S/N ratio of the information signal from the differential amplifier 16 is higher when the light intensity to the APD 11 is reduced ($\theta<45°$) than when the light is split equally ($\theta=45°$).

In the embodiment shown in FIG. 1, only one of the light beams divided by the beam splitter 8 is converted photoelectrically by the APD, but it is also possible to convert both light beams with APD's. In case of using two APD's for photoelectric conversion, the temperature compensating circuit for APD may be dispensed with if two APD's are positioned in the same temperature condition. Two APD's positioned in such manner show the same temperature-dependent changes in the amplification factor, whereby the noise components contained in two input signals to the differential amplifier always remain mutually the same.

Also in the embodiment shown in FIG. 1, the light splitting is achieved by the rotation of plane of polarization through the combination of a $\lambda/2$-plate 7 and a beam splitter 8, but it is also possible to dispense with the $\lambda/2$-plate 7 by rotating the beam splitter 8 about the optical axis.

In the foregoing there has been explained so-called disk apparatus utilizing a disk-shaped recording medium, but the present invention is also applicable to any other system in which a magnetooptical recording medium and a regenerating light beam are mutually moved.

For example such mutual movement can be achieved by moving a card-shaped substrate on which a magnetooptical recording material is deposited by vacuum evaporation or sputtering, with respect to a fixed light beam, or by moving said light beam with respect to said card fixed at a position.

Now reference is made to FIG. 5, in which a semiconductor laser 2 is activated by a laser driving circuit 35 to emit a laser beam for signal regeneration.

An optical system 18, for optically regenerating the information recorded on a magnetooptical recording medium 1 by means of the laser beam from the semiconductor laser 2 includes optical members 3, 4, 5, 6, 7, 8, 9 and 10 shows in FIG. 1 and is adapted to split the information regenerating light beam from the recording medium 1 into two optical paths leading to PIN's 11a, 12 according to the angle of plane of polarization.

The PIN 11a converts a light beam from the optical system 18 into an electrical current signal, which is converted into a voltage signal by a variable gain amplifier 13a with a gain variably controlled by an external signal.

A differential amplifier 16 receives the output of a fixed gain amplifier 14 at the negative input terminal and the output of the variable gain amplifier 13a at the positive input terminal.

Low-pass filters 31, 32 are provided to extract the DC components from the output signals of the amplifiers 13a, 14. The band width of the low-pass filters 31, 32 is selected for example as 0.1 Hz because of the following reason.

If the noise contained in the output signal of the differential amplifier 16 is initially eliminated in ideal manner, the deterioration in performance afterwards is due to certain time-dependent changes such as changes in the condition of use or smear in the optical system. The time-dependent change used herein shall mean a signal change of a frequency sufficiently lower than that of various signals, for example the control signals for focusing, tracking or signal regeneration, or the information signal. The principal frequency components of the control signals are in the range of several Hz to several tens of Hz while those of the information signal are in the range of several MHz. In consideration of these facts the band width of the low-pass filters 31, 32 is selected in a range of 0.1 Hz.

The output signals of said low-pass filters 31, 32 are supplied to a differential amplifier 33, which constitutes an error detecting circuit 37, together with the low-pass filters 31, 32, for detecting the difference between the averages (DC components) of two input signals to the differential amplifier 16.

The output signal of the error detecting circuit 37 is supplied to an integrator 36 which smooths said output signal into a DC voltage as a signal 40 for controlling the gain of the variable gain amplifier 13a. In this manner there is formed a loop for controlling the gain of the variable gain amplifier 13a for equalizing the levels of two input signals to the differential amplifier 16.

In addition, the length of lines from photoelectric converting elements 11a, 12 through the amplifiers 13a, 14 to the differential amplifier 16 is so regulated that two input signals have no phase difference at the input terminals of the differential amplifier 16. More specifically, in forming the circuit block shown in FIG. 5 by printed circuits, the circuit patterns of the signal lines 38, 39 should be so regulated at the designing stage to show no phase difference for a pilot signal of a determined frequency.

In the following there will be explained the function of the embodiment shown in FIG. 5.

FIGS. 6A and 6B show the frequency characteristics of the regenerated signal and noise component contained in the output signals which are obtained by photoelectric conversion in the elements 11a, 12 of two light beams from the optical system 18.

FIG. 6B shows the output frequency characteristic of the photoelectric converting element 12 and the amplifier 14, receiving a larger amount of light, while FIG. 6A shows that of the element 11a and the amplifier 13a receiving a smaller amount of light, wherein S1 and S2 are regenerated signals, and n1 and n2 are noise components.

The noise component n1 is represented by:

$$n1 = An \cdot \sin\{\omega_n(t+\tau)\} \quad (2)$$

while the noise component n2 is represented by:

$$n2 = An \cdot \sin(\omega_n t) \quad (3)$$

wherein the amplitude An always varies which $\omega_n$ represents the frequency of the noise component.

The output nd of said noise components n1, n2 from the differential amplifier is given by:

$$nd = n1 - n2 \quad (4)$$

-continued $$= 2An \cdot \sin\{\omega_n(\tau/2)\} \cdot \cos\omega_n(t + \tau/2)$$

and the amplitude of the noise output nd is given by:

$$2An \cdot \sin\omega_n(\tau/2)$$

which is equal to zero only when $\tau = 0$ or proportional to $\omega_n$ when $\tau \neq 0$ ($\tau \simeq 0$).

Thus, if the length of the signal lines 38, 39 is so regulated as to obtain a zero phase difference at the input terminals of the differential amplifier 16, it provides the sum of the regenerated signals S1 and S2 as the differential output signal Sd as shown in FIG. 6C when the gain of the variable gain amplifier 13a is controlled to minimize the difference between the amplitudes of the noise components n1 and n2. On the other hand, in case the adjustments of amplitude and phase are unsatisfactory, the value of An becomes different in the equations (2) and (3) and $\tau$ becomes different from zero. Thus, as shown in FIG. 6D, the difference in amplitude generates a noise component n3 of a constant level, represented by a broken line, regardless of the frequency, in the output of the differential amplifier 16. Also the unsatisfactory phase adjustment generates a noise component n4 proportionally increasing with the frequency $f (= \omega/2\pi)$ as will be apparent from the equation (4).

In the embodiment shown in FIG. 5, however, the generated light beam obtained from the laser beam of the semiconductor laser 2 is divided by the optical system 18 and amplified by the amplifiers 13a, 14. The DC components in the outputs thereof are extracted by the low-pass filters 31, 32, and the difference of said components is obtained by the differential amplifier 33 to control the gain of the variable gain amplifier 13a thereby reducing the output of the differential amplifier 33 in the error detecting circuit 37 to zero. Consequently the amplitude (average) levels of the noise components n1, n2 contained in two input signals to the differential amplifier 16 are automatically balanced, and the noise component n3, shown in FIG. 6D, caused by the difference in amplitude is eliminated by differential amplification of the common phase components n1 and n2.

Also the noise component n4 shown in FIG. 6D, generated by the phase difference and increasing proportionally with the frequency, does not appear since the phase difference of two input signals to the differential amplifier 16 is reduced to zero by the adjustment of the length of signal lines 38, 39.

Though it is difficult to reduce the phase difference or delay time completely to zero by the adjustment of the length of signal lines, in practice a delay time $\tau$ equal to or less than 3 nsec, or a phase angle equal to or less than 10.8° at f = 10 MHz is sufficient for the purpose.

In a circuit shown in FIG. 7, the photoelectric converting element 11a is replaced by an avalanche photodiode 86, and the gain control is achieved by the adjustment of the reverse voltage.

As in the embodiment shown in FIG. 1, the light beam from the optical system 18 is introduced into the avalanche photodiode 86 which is serially connected with an reverse voltage generating circuit 87, wherein the reverse voltage of said avalanche photodiode 86 is regulated by the output signal 40 of the integrator 36, and the output signal of said avalanche photodiode is converted into a voltage signal by a buffer amplifier 88. The avalanche photodiode 86 can vary the photoelectric converting characteristic according to the reverse voltage even for the same incident light, and this property is utilized for the gain control of the regenerated signal in an equivalent manner as in the variable gain amplifier.

In the embodiment shown in FIG. 5 the amplification factor of the amplifier 13a is continuously controlled by the output of the low-pass filters 31, 32, but it is also possible to control the amplification factor of the amplifier 13a for example by detecting the outputs of the low-pass filters 31, 32 at regular intervals by means of a microprocessor.

What is claimed is:

1. An apparatus for irradiating a magnetooptical recording medium with a linearly polarized light beam and detecting the light from said medium, comprising:
   (a) optical means for dividing the light from said medium into two light components having different planes of polarization;
   (b) first converting means for converting one of said two light components into a first electrical signal;
   (c) second converting means for converting the other of said two light components into a second electrical signal; and
   (d) control means for controlling said second converting means in response to said first and second electrical signals.

2. An apparatus according to claim 1, wherein said control means includes:
   first detecting means for detecting the average level of said first electrical signal to generate a first detection signal; and
   second detecting means for detecting the average level of said second electrical signal to generate a second detection signal.

3. An apparatus according to claim 2, wherein said control means is adapted to control the amplification factor of said second converting means in response to said first and second detection signals.

4. An apparatus according to claim 2, wherein said first detection signal is substantially equal to the average level of said first electrical signal, and said second detection signal is substantially equal to the average level of said second electrical signal.

5. An apparatus according to claim 4, wherein said first and second detecting means respectively include low-pass filters.

6. An apparatus according to claim 4, wherein said control means is adapted to control the amplification factor of said second converting means in such a direction that said first and second detection signals mutually become substantially equal.

7. An apparatus according to claim 6, wherein said control means includes means for detecting the difference between the levels of said first and second detection signals.

8. An apparatus according to claim 1, wherein said optical means is adapted to divide the light from said medium in such a manner that the average intensity of one of said two light components is stronger than that of the other.

9. An apparatus for irradiating a magnetooptical recording medium with a linearly polarized light beam and detecting the light from said medium, comprising:
   (a) optical means for dividing the light from said medium into two light components having different planes of polarization, said optical means dividing the light from said medium in such a manner that the average intensity of one of said two light components is stronger than that of the other;
   (b) first converting means for converting said one of said two light components into a first electrical signal with a determined amplification factor;
   (c) second converting means for converting said other of said two light components into a second electrical signal, said second converting means comprising an avalanche photodiode; and
   (d) control means for controlling said second converting means in such a manner that the amplification factor thereof becomes higher than said determined ampification factor, said control means including means for applying a voltage to said avalanche photodiode.

10. An apparatus for irradiating a magnetooptical recording medium with a linearly polarized light beam and detecting the light from said medium, comprising:
    (a) optical means for dividing the light from said medium into two light components having different planes of polarization, said optical means dividing the light from said medium in such a manner that the average intensity of one of said two light components is stronger than that of the other;
    (b) first converting means for converting said one of said two light components into a first electrical signal with a determined amplification factor;
    (c) second converting means for converting said other of said two light components into a second electrical signal; and
    (d) control means for controlling said second converting means in such a manner that the amplification factor thereof becomes higher than said determined amplification factor, said control means including first detecting means for detecting the average level of said first eletrical signal to generate a first detection signal, and second detecting means for detecting the average level of said second electrical signal to generate a second detection signal, said control means being adapted to control the amplification factor of said second converting means in response to said first and second detection signals.

11. An apparatus for irradiating a magnetooptical recording medium with a linearly polarized light beam and detecting the light from said medium, comprising:
    (a) optical means for dividing the light from said medium into two light components having different planes of polarization, said optical means dividing the light from said medium in such a manner that the average intensity of one of said two light components is stronger than that of the other;
    (b) first converting means for converting said one of said two light components into a first electrical signal with a determined amplification factor;
    (c) second converting means for converting said other of said two light components into a second electrical signal; and
    (d) control means for controlling said second converting means in such a manner that the amplification factor thereof becomes higher than said determined amplification factor, said control means including first detecting means for detecting the average level of said first electrical signal to generate a first detection signal, and second detecting means for detecting the average level of said second electrical signal to generate a second detection signal, said first detection signal being substantially equal to the average level of said first electrical signal, said second detection signal being substantially equal to the average level of said second electrical signal, said first and second detecting means including low-pass filters, respectively.

12. An apparatus for irradiating a magnetooptical recording medium with a linearly polarized light beam and detecting the light from said medium, comprising:
 (a) optical means for dividing the light from said medium into two light components having different planes of polarization, said optical means dividing the light from said medium in such a manner that the average intensity of one of said two light components is stronger than that of the other;
 (b) first converting means for converting said one of said two light components into a first electrical signal with a determined amplification factor;
 (c) second converting means for converting said other of said two light components into a second electrical signal; and
 (d) control means for controlling said second converting means in such a manner that the amplification factor thereof becomes higher than said determined amplification factor, said control means including first detecting means for detecting the average level of said first electrical signal to generate a first detection signal, and second detecting means for detecting the average level of said second electrical signal to generate a second detection signal, said first detection signal being substantially equal to the average level of said first electrical signal, and said second detection signal being substantially equal to the average level of said second electrical signal, said control means being adapted to control the amplification factor of said second converting means in such a direction that said first and second detection signals mutually become substantially equal.

13. An apparatus according to claim 12, wherein said control means includes means for detecting the difference between the levels of said first and second detection signals.

* * * * *